May 5, 1964 R. E. FUTER 3,131,974
AIR-LIFT CONVEYING OF SOLID OBJECTS
Filed May 3, 1961 2 Sheets-Sheet 1
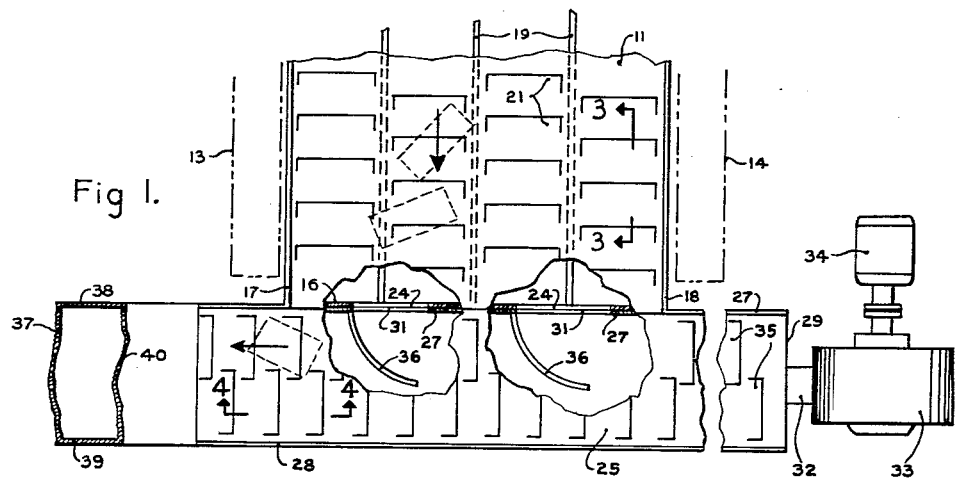
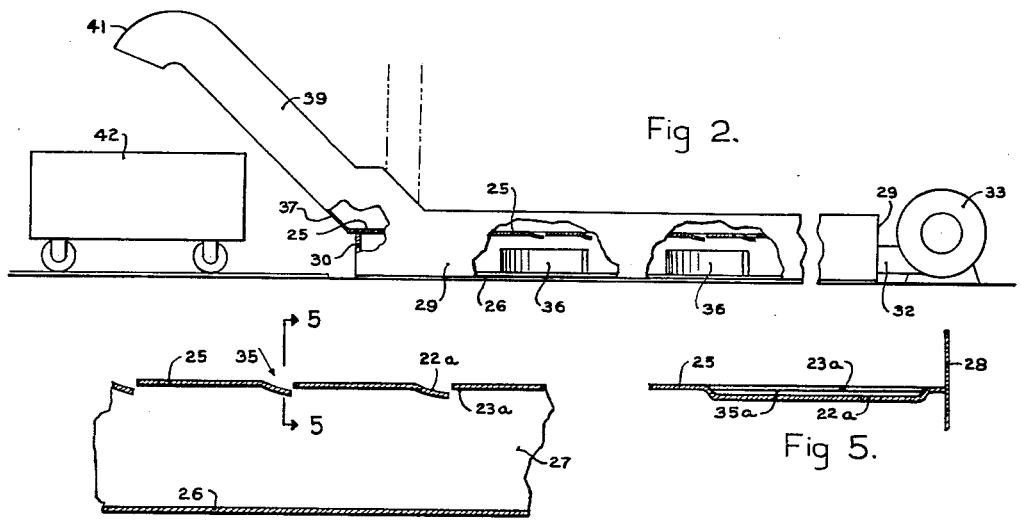
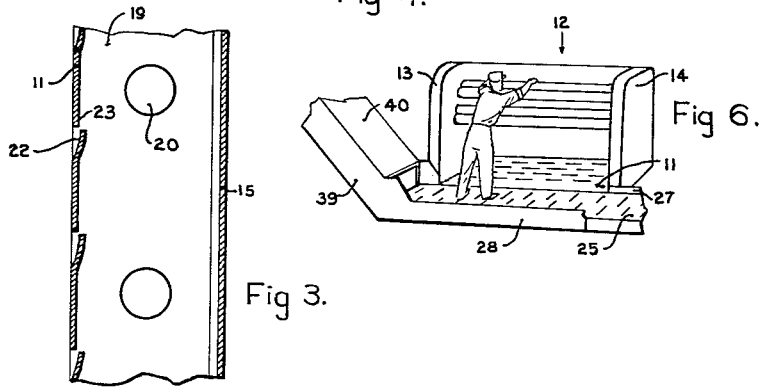

May 5, 1964     R. E. FUTER     3,131,974
AIR-LIFT CONVEYING OF SOLID OBJECTS
Filed May 3, 1961     2 Sheets-Sheet 2

United States Patent Office 3,131,974
Patented May 5, 1964

3,131,974
AIR-LIFT CONVEYING OF SOLID OBJECTS
Rudolph E. Futer, Piedmont, Calif.
(1401 Eastshore Highway, Berkeley 10, Calif.)
Filed May 3, 1961, Ser. No. 125,885
14 Claims. (Cl. 302—31)

This is a continuation-in-part of my application Serial No. 61,583, filed October 10, 1960, now abandoned.

The invention relates to a method and apparatus for conveying solid objects by means of air-jets. Examples of such objects are card and corrugated box blanks, packages, luber, sawdust, grains and cereals, paper and cardboard scraps, and waste metal from cutter, lathe and slotter machines.

More particularly, the invention is concerned with the use of air-jets for moving such solid objects without moving parts, wherein said objects are moved successively along a plurality of angularly disposed conveyors with change of direction of movement; wherein such objects are moved from an extended collecting zone onto which they are placed or dropped and carried into a common stream in a take-off conveyor; and the movement of such objects upwards along an inclined conveyor and discharge into a hopper or other receptacle, e.g., by free fall. It is further concerned with improvements in the construction of the air-jet passages in the membranes which form the floors of the conveyors whereby a more effective jet action is attained. Still another feature is a construction which permits dual use of the conveyor membrane for moving solid objects by air-jet action and as a support and walkway for workmen while adjusting, operating or maintaining an associated machine.

The use of air-blasts for moving solid objects along conveyor troughs is known. However, prior application of the air-blasts to upwardly open conveyors were the movement of such objects along linear courses and did not permit movement along successive courses which are angularly related, or the movement upward along an incline, or the collection of such objects from a collecting area. Further, prior constructions did not adapt themselves to a construction which permitted use of the conveyor bed additionally as a support or walkway. Finally, there were certain drawbacks in the arrangements of the air-jet passages.

It is also known to convey solid objects through closed ducts, commonly known as pneumatic conveyors, carried by an air current. A drawback of such conveyors has been the inconvenience of charging the objects to be transported from a plurality of stations inasmuch as a branch pipe must be provided for each station; also, when a large number of intake openings is used an excessive load is placed on the suction fans unless closures or special charging mechanisms are used. The latter drawback arises from the circumstance that pneumatic conveyors are inherently not adapted to transport solid objects at low speeds and a strong suction, capable of producing speeds upwards of 2,000 feet per minute, prevails at each intake. Such conveyors have, therefore, heretofore been used principally for point-to-point transport.

Broadly, this invention has as its objects the provision of an air-lift conveyor which is capable of moving solid objects over elongated courses which are open so that the objects can be introduced or removed at any point along the conveyor or, in some embodiments, throughout an extended collecting area and/or with change in direction and/or elevation; the improvement of the air-jet action; and the movement of objects at speeds lower than the minimum suitable for pneumatic conveyors.

Specific objects are:

To provide an upwardly open air-lift conveyor system and method wherein solid objects are moved by means of air-jets successively along a series of angularly related courses, e.g., feeder and take-off courses, the change in direction of movement at the junction of the courses being effected without moving parts or significant contact with deflecting walls.

To collect objects from a collecting zone having an extended area onto which the objects are placed or dropped and to discharge the collected objects in a common take-off stream.

To improve the distribution of air under pressure to various plenum chambers associated with individual sections of an air-lift conveying system.

To provide an air-lift conveyor and conveying method capable of moving the objects with change in elevation, e.g., upwardly along an inclined path from the downstream end of a principal air-lift conveyor for discharge into a receptacle.

To extend the capabilities and improve the operation of pneumatic conveyors by providing means for receiving solid objects to be transported from a multitude of points.

To provide an improved membrane construction for use as the conveyor floor wherein the air passages are shaped to produce air-jets which move solid objects more effectively for a given air pressure or power consumption and which are more dependable.

To provide a conveyor floor having a multitude of passages for forming air-jets which has improved structural strength and directs air jets which sweep the full area of the floor.

In summary, the air-lift conveyor has, as its floor, a rigid membrane which forms the top of a plenum chamber to which air is supplied under pressure, the membrane having a multitude of air passages extending therethrough and inclined in a common longitudinal direction to form air-jets which have upward and strong horizontal flow components to lift objects on the membrane and propel them longitudinally over the membrane. The conveyor may be provided with low side walls extending upwards from the margins of the membrane and is preferably vented along substantially its full length, e.g., open to the atmosphere to prevent the build-up of back-pressure and to afford access wherever desired. It should be understood that "lifting" does not imply elevation of the objects to any great distance above the membrane but denotes a slight raising of the objects or of parts thereof whereby frictional drag is largely eliminated.

The aforesaid specific objects are attained by the following features:

At least one upstream or feeder conveyor and a downstream or take-off conveyor the longitudinal axes of which intersect, e.g., at an angle of 60° to 120°, are associated so that the downstream end of the former terminates at the near margin of the other, the floor of the latter being at the same or a lower elevation at their junction and said junction being free from obstruction, the air passages in the zone of the downstream floor bounded by extensions of the margins of the upstream floor being directed in the downstream direction of the downstream conveyor. Blocking means, such as a side wall previously mentioned, is preferably provided at the side of the downstream conveyor remote from the other conveyor and opposite to it; however, such a wall is not needed when a pair of opposed upstream conveyors join the same downstream conveyor at a common zone. The solid objects move from the upstream conveyor onto said zone of the downstream floor and are swept along or over the downstream conveyor with little or no contact with the blocking means. The original momentum of the objects, acquired on the upstream conveyor, may be checked by an air cushion or by reverse air currents created by said blocking means, but the exact mechanism of this phenomenon is not understood.

To collect objects from an extended collecting zone, such as the floor beneath and near cutting machines, the said floor is formed with a multitude of air-passages extending therethrough and inclined toward a common margin of the floor and a take-off air-jet conveyor is mounted along the said margin to form air-jets having directions more or less transverse to those of the collecting zone to form a downstream or take-off conveyor. The latter is related to the floor of the collecting zone as was described in the preceding paragraph. The collecting-zone floor may be suitably supported and reinforced to support workmen.

When a plurality of such air-jet conveyors are associated (the term being used generically to include a collecting-zone floor) each has a plenum chamber and these chambers may be supplied with air under pressure by individual compressors, by separate ducts from a manifold system supplied by a single compressor, or by transfer of air between chambers. According to one feature using the last-mentioned scheme, the air is admitted to the end of one plenum chamber which communicates through one or more openings in the side wall thereof with another chamber and a deflector is mounted within the former, extending in the upstream direction of air flow within said former chamber from the downstream end of the opening to assist in the passage of air through the opening and tend to equalize the air pressures within the chambers.

The discharge end of the air-lift conveyor may be joined to an upwardly inclined chute for carrying solid objects to an elevated discharge point for entry into another similar conveyor or for fall by gravity into a receptacle. In one embodiment the chute floor is passive, i.e., not provided with air-jets and the objects move up the inclined floor by momentum and the draft created by the air-jets of the associated conveyor. In another embodiment the chute floor has air-passages and a plenum chamber for lifting and propelling the objects. In both embodiments the chute floor preferably has side walls and is vented, e.g., open upwards to prevent the build-up of back pressure. A deflector may be mounted at the highest point to prevent over-shooting of the objects.

The downstream end of the air-lift conveyor may also be associated with a pneumatic conveyor duct having its open intake end directed in the upstream direction to receive the conveyed objects. In this manner it is possible to charge objects to the duct from a plurality of stations along the air-lift conveyor. Also, a pneumatic conveyor duct arranged in this manner operates more effectively with reduced suction because the objects enter with forward momentum.

It was found that improved jet action is attained by forming the air-passages in the membrane as slits which extend transversely to the longitudinal direction of the conveyor and inclining the parts of the membrane on the downstream sides of the slits downwardly to the slits so that there are no upward projections or protuberances and a substantially continuous upper membrane surface is provided. This construction can be fabricated by deforming sheet metal with a die and bed plate which, in one operation, forms the slit and deforms the metal or, in the case of membranes made of plastic, by casting or molding. In either case it is highly desirable to avoid overlap of the membrane parts on opposite sides of the slits. Such overlap is objectionable because it introduces needless pressure loss due to flow of air through a confined, extremely narrow channel and because it is subject to clogging by dust, lint and the like, leading to non-uniform air flow.

To improve the structural strength of the membrane the slits are advantageously arranged in a plurality of parallel rows with the slits of each row staggered with respect to those of the adjoining row, the resulting air-jets being directed to sweep along the rows. Improved coverage of all parts of the membrane is attained by making the slits of sufficient length to overlap slightly the ends of the adjoining row.

The invention will be further described with reference to the accompanying drawings forming a part of this specification and showing certain preferred embodiments by way of illustration, wherein:

FIGURE 1 is a plan view of a conveyor according to the invention suitable for collecting objects from a work area, associated with a passive discharge chute, parts being broken away to show the air-deflectors and the frame of an associated machine being shown in phantom;

FIGURE 2 is an elevation view of the conveyor shown in FIGURE 1, a part of the side wall being broken away;

Figure 7:
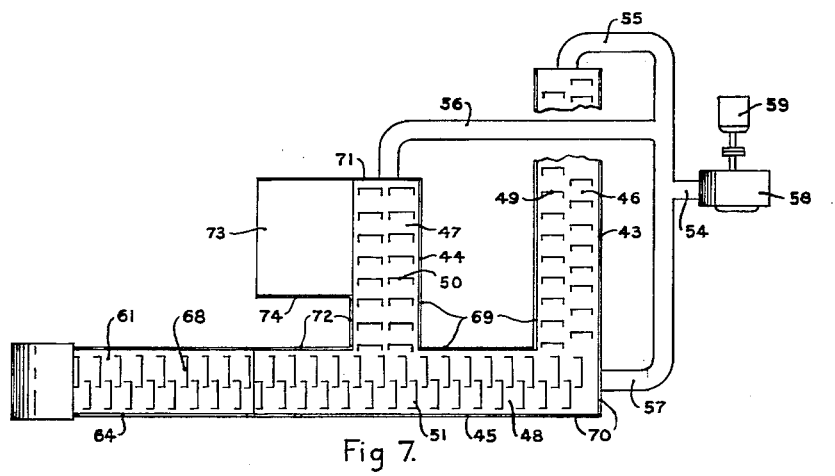
Figure 8:
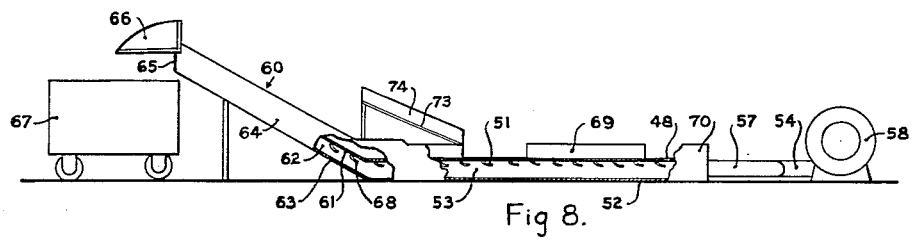
Figure 10:
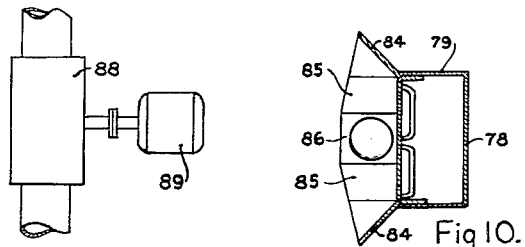
Figure 9:
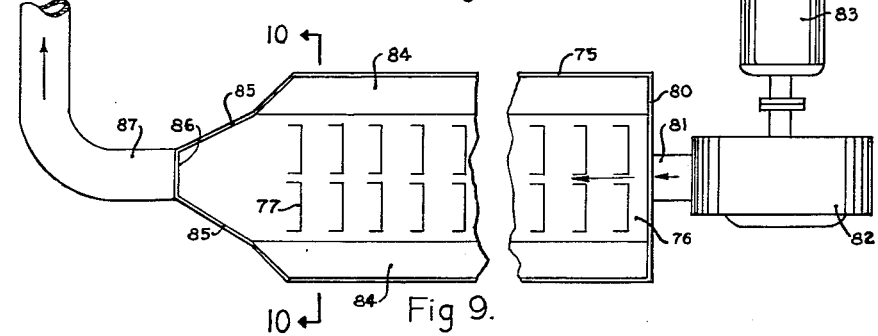

FIGURES 3 and 4 are fragmentary sectional views taken on the lines 3—3 and 4—4, respectively, of FIGURE 1, shown to an enlarged scale;

FIGURE 5 is a sectional view taken on the line 5—5 of FIGURE 4;

FIGURE 6 is a miniature perspective view illustrating the rigidity required to support a workman while servicing the associated machine;

FIGURE 7 is a plan view of a modified embodiment wherein a plurality of feeder conveyors are associated with one take-off conveyor and the discharge chute has passages for forming air-jets;

FIGURE 8 is an elevation view of the conveyor system shown in FIGURE 7;

FIGURE 9 is a plan view of a third embodiment, showing the air-lift conveyor in combination with a pneumatic conveyor; and FIGURE 10 is a transverse sectional view taken on the line 10—10 of FIGURE 9.

Referring to FIGURES 1-6, the conveying system includes an air-table or membrane 11 which forms the floor of a collecting zone which is associated with a machine 12 having standards 13, 14. The table forms the top of a plenum chamber having a bottom 15, end walls (of which only the wall 16 appears) and side walls 17 and 18, the latter extending optionally a small distance, e.g., four inches, above the table to form side walls for the collecting zone. The table is supported inwardly from its margins by any suitable means, such as stringers 19 having holes 20 to equalize the air pressure on opposite sides thereof. The table may be of sheet metal and is formed with a plurality of parallel rows of air-passages 21. As appears in FIGURE 3, each air-passage is formed by a transverse slit and the membrane portion 22 on the downstream side of the slit is depressed to slope downwardly toward the slit edge, whereat its upper surface is below the lower surface of the membrane portion 23 at the upstream edge of the slit, without overlap between these portions. It may be noted that the metal is not normally cut at the lateral margins of the portions 22. The vertical gap between the portions 22 and 23 is typically between $\frac{1}{32}$ and $\frac{3}{32}$ inch; when light-weight or web-like objects such as paper and cardboard cuttings and scrap are to be conveyed the gap is normally not in excess of $\frac{1}{16}$ inch. The longitudinal spacing of the passages is typically from three to six inches and the lengths of the portions 22 are preferably a minor fraction thereof, e.g., less than one-fourth of the spacing, so as to maintain a maximum of continuous, plane upper surface throughout the membrane. The end wall 16 has air-inlet openings 24.

It will be noted that the passages 21 of each row are staggered with respect to the adjoining row or rows. This arrangement results in increased structural strength and rigidity of the membrane.

The air passages 21 are all directed toward the margin at the wall 16. Extending along this margin is a take-off conveyor which comprises a floor or membrane 25 which forms the top of a plenum chamber having a bottom wall 26, side walls 27 and 28, and end walls 29 and 30. The side wall 27 has openings 31 in registry with the openings 24. The end wall 29 has an opening to which is fitted an air-duct 32 connected to a source of air under pressure, such as the discharge of an air blower 33 which is driven by a motor 34. The membrane 25 has two longitudinal rows of air-passages 35 which are shaped as was described above for the passages 21, with the difference that the slits are longer, so as to overlap the ends of the slits in the adjoining row. In this manner distribution of air flowing from the plenum chamber over the full area of the membrane is improved while the structural strength and rigidity of the membrane are not reduced significantly. It will be understood that this overlapping construction is optional and may be applied to the membrane 11. Reference numbers 22a and 23a denote the membrane portions at the downstream and upstream sides of the slits, corresponding to the portions 22 and 23 previously described; in FIGURE 5 the vertical gap between these portions is shown at 35a. These passages are all directed in a common longitudinal direction, toward the left of the drawing. The side wall 28 extends above the membrane 25 to form blocking means and the wall 27 extends above the membrane only at the parts beyond the limits of the table 11; where the table 11 is joined to the membrane 25 the wall is relieved to permit the unobstructed passage of objects. The membrane 25 is at the same level as or at a lower level than the table 11, equal elevations being illustrated.

The plenum chamber of the take-off conveyor contains, for each pair of registered openings 24, 31, a deflector 36 having a height less than the inside height of the chamber and thereby clearing the underside of the membrane 25 so as not to obstruct the entry of air into the passages 35. Each deflector is fixed to the follow edge of the respective opening 31 and projects forwardly to catch the incoming stream of air from the duct 32 and deflect a portion thereof through the openings into the plenum chamber beneath the membrane 11. Without these deflectors there would be a tendency of the air-stream to create a low-pressure zone and draw air from the other chamber. These deflectors, therefore, operate to attain equalization of air pressure within the plenum chambers.

At the downstream end of the take-off conveyor is a passive "up and over" discharge chute which comprises a chute floor 37 and side walls 38, 39. The chute may be provided with a cover 40, although this cover is not necessary and is usually omitted. The highest part of the cover has a downwardly curved part 41 which forms a deflector for preventing over-shooting of the objects beyond the end of the chute. (When the conveyor is not covered the deflector may be formed as will be described for FIGURES 7 and 8.) The discharged objects fall by gravity from the top of the chute into a suitable receptacle, such as a wagon 42.

In operation, objects falling onto the table 11 from the machine 12 are swept onto the membrane 25 by the air-jets which issue from the passages 21. They are then moved by the air-jets from the passages 35 over the membrane 25 and, after attaining the downstream end thereof, move upwardly along the chute floor 37 by their momentum and the airdraft from the passages 35. They fall into the receptacle 42.

Each air-jet issuing from a passage 21 or 35 has an upward and a horizontal flow component, the latter being considerably greater than the former. The result is the formation of a thin sheet of air which moves closely adjacently to the membrane surfaces. Very little air disturbance is created at a height of two or three inches above these surfaces. These air-jets lift the solid objects slightly, thereby reducing frictional drag; they further propel such objects over the membrane.

These conveyors, although operated under pressure, require only a sustained pressure in the plenum chambers in conformity with the size of the gap 35a and the density of the material to be transported, typically 5 to 20 pounds per square foot; most operations are carried out with excellent efficiency at a pressure of 10 to 15 pounds per square foot. The required pressure is primarily dependent upon the density of the objects in terms of pounds of weight per square foot of horizontal area, or, more accurately, the weight to area ratio.

The conveying characteristics and the advantages of avoiding overlap of the membrane portions on opposite sides of the slits are demonstrated by the data in the following example:

Two conveyors, identical as to dimensions and slit dimensions ($\frac{1}{16}$ inch gap height) were compared. The conveyor with membrane B was constructed as shown in FIGURES 4 and 5, without overlap of the membrane portions on opposite sides of the slits. The conveyor with membrane A had the said membrane portions overlapped for distances several times the height of the gap. The conveying capabilities of the membranes were determined at different plenum pressures. The objects are characterized in terms of ounces of weight per square foot of area, and the results are given in the following table:

| Plenum chamber pressure, inches of water | Maximum weight to area ratio of transportable objects | | Percent improvement |
|---|---|---|---|
| | Membrane A | Membrane B | |
| 1.5 | 90 | 110 | 22 |
| 2.0 | 115 | 150 | 31 |
| 2.5 | 140 | 190 | 36 |
| 3.0 | 160 | 230 | 44 |
| 3.5 | 180 | 280 | 55 |

The foregoing comparison demonstrates an advantage in avoiding the membrane overlap at the slit gap. The advantage grows as objects of higher density, requiring increased plenum pressures, are transported.

Apart from the improvement in conveying power, avoidance of the overlap gives the advantage of more dependable and longer service-free operation because small particles of solids, present in many industrial atmospheres and often derived from the articles being transported, are more readily lodged in the space between the overlapped membrane portions than in the gap described.

The conveying system shown in FIGURES 7 and 8 includes two upstream or feeder conveyors 43 and 44 and a downstream or take-off conveyor 45 having flat, co-planar membranes 46, 47 and 48, each formed with air passages extending therethrough. For purposes of illustration, three forms of passage arrangement are shown: In membrane 46 the passages 49 are arranged in two parallel, longitudinal rows and staggered, but without lateral overlap; in membrane 47 the passages 50 are in two similar rows but not staggered; and in membrane 48 the passages 51 are arranged as in membrane 46 but are longer to overlap laterally. Each passage is formed as was previously described for the passages 21 and 35. Each membrane has beneath it a plenum chamber including confining bottom, side and end walls (only the bottom wall 52 of the plenum chamber 53 of the take-off conveyor appears) to which air under pressure is supplied from a manifold 54 via branch ducts 55, 56 and 57, respectively. Air is supplied to the manifold by a compressor 58 driven by a motor 59.

At the downstream end of conveyor 45 is an "up and over" discharge chute 60 having an upwardly inclined membrane 61 which merges with the downstream end of the membrane 48 and forms the top of a chute plenum chamber 62. This chamber has a bottom wall 63, side walls 64 and one end wall 65 and is in free communication at its upstream end with the plenum chamber 53 to receive air under pressure therefrom. A deflector 66 is mounted above and beyond the highest point of the chute to deflect objects downward for fall by gravity into a receptacle 67. The membrane has a series of air-passages 68 extending therethrough and directed to emit air-jets having upward components and components directed along the membrane toward its upper end.

Each of the conveyors and the discharge chute are provided with low side walls 69–72 save to the junctions of the membrances; they are vented along the lengths thereof, e.g., open to the atmosphere to prevent the build-up of back-pressure and afford access.

Also shown is a feed apron 73 having lateral guide walls 74 and being inclined downwardly to the membrane 47. Objects placed on the apron slide onto the conveyor for movement thereon.

Operation is as was described for the first embodiment, save that the chute has air-jets which lift and propel the objects upwards along the membrane.

FIGURES 9 and 10 show an air-lift conveyor 75 having a membrane 76 with air-passages 77 extending therethrough and forming the top of a plenum chamber defined by bottom and side walls 78 and 79 and end walls of which only the wall 80 appears. Air under pressure is supplied to this chamber via a duct 81 from a blower 82 which is driven by a motor 83. Side walls 84 rise divergently from the membrane 76 and are joined at their downstream ends to deflector walls 85 which diverge upstream from an end wall 86, toward which the passages 77 are directed.

Fitted to a hole in the end wall 86 is the open intake end of a pneumatic conveyor duct 87 which is provided with means such as a bladed fan 88, driven by a motor 89, for inducing air-flow in the direction indicated by the arrow. It will be understood that the duct 87 may be terminated in any suitable way, such as a cyclone, not shown.

The open air-lift conveyor 75 can receive objects to be transported at any point along its length and these objects are accelerated by the air-jets thereof and moved over the membrane 76 into the pneumatic conveyor duct 87 with forward momentum. This permits the pneumatic duct to be charged from a multitude of stations without excessive power consumption and without complex branch ducts or charging devices. The arrangement of the air-lift conveyor in combination with the pneumatic conveyor further reduces the air-flow required within the duct 87.

I claim as my invention:

1. An air-lift conveyor which comprises an air chamber having confining walls and bounded at the top by a membrane, and means for admitting air under pressure into said chamber, said membrane being formed throughout its length with a series of longitudinally spaced slits having parallel, transverse edges of lengths several times their vertical displacement, the portions of the membrane at the downstream edges of said slits being depressed and inclined upwards in the downstream direction at angles less than 45° to the longitudinal axis of the membrane, and the remaining portions of the membrane extending downstream from said inclined portions to the upstream edges of the next slits and having unobstructed upper surfaces which lie in common, straight, longitudinal lines, said upstream edges being situated substantially above the said downstream edges without longitudinal overlap, whereby said membrane provides laterally elongated passages for the upward flow of air from said chamber with strong horizontal flow components and further provides an upper surface for the linear movement of solid objects by the air jets from said slits in close, uniform relation to the membrane along its full length except at said inclined portions, said membrane being upwardly open to the atmosphere throughout substantially the full length thereof.

2. An air-lift conveyor as defined in claim 1 wherein said membrane is flat except at said inclined portions.

3. An air-lift conveyor as defined in claim 1 wherein said slits are arranged in a plurality of longitudinal rows and the slits of one row are staggered longitudinally with respect to those of an adjacent row.

4. An air-lift conveyor as defined in claim 3 wherein the slits of said one row overlap the slits of said adjacent row in the transverse directions.

5. In combination with the conveyor defined in claim 1, a pair of low side walls extending upwards from the membrane, one at each margin thereof.

6. In combination with the conveyor defined in claim 1, an upwardly inclined discharge chute at the downstream end of said membrane angularly related thereto, said chute comprising an imperforate floor for the upward movement thereon of said solid objects.

7. The air-lift conveyor combination defined in claim 6 wherein said chute floor is imperforate, for the upward movement of said objects by momentum and the air currents resulting from said air jets of the membrane.

8. The air-lift conveyor combination defined in claim 6 wherein said chute is provided with an air chamber situated beneath said chute floor and having means for admitting air thereto, and said floor is formed with a plurality of air passages extending therethrough and inclined upwardly in said downstream direction to promote upward movement of said objects along said floor.

9. The air-lift conveyor combination defined in claim 6 which further includes a deflector situated above and immediately downstream from the highest part of said inclined chute floor and positioned to deflect said objects downwardly.

10. An air-lift conveyor system which comprises a principal conveyor as defined in claim 1 and a feeder conveyor also constructed as defined in claim 1, said conveyors having longitudinal axes which intersect at an angle between about 60° and 120°, the level of said feeder conveyor membrane being, at its junction with the principal conveyor membrane, at least as high as that of the latter and the slits in the zone of the principal conveyor membrane opposite the feeder conveyor being directed like the other slits in the principal conveyor membrane.

11. In combination with the conveyor defined in claim 1, a pneumatic take-off conveyor situated at the downstream end of the membrane and comprising a peripherally closed duct having an open intake which is directed in the upstream direction, and means connected to said duct for inducing air flow therethrough for moving said objects through the duct.

12. The combination of an air-lift conveyor and a pneumatic take-off conveyor which comprises: an air chamber having confining walls and bounded at the top by a membrane, means for admitting air under pressure into said chamber, said membrane being formed with a multitude of air passages extending therethrough and inclined in a common downstream direction for the air-propulsion of solid objects placed on the membrane, said membrane being upwardly open to the atmosphere throughout substantially the full length thereof for the escape of air and placement of objects thereon, a peripherally closed pneumatic conveyor duct having an open intake end positioned at the downstream end of said membrane and directed in the upstream direction to receive said objects after movement over said membrane, and means connected to said duct for inducing air flow therethrough for moving said objects through the duct.

13. The combination defined in claim 12 which includes guide walls diverging upstream from said intake end of the conveyor intake end over said membrane for deflecting said objects into the duct.

14. An air-lift conveyor system for collecting solid objects from an extended area into a common stream which comprises: a rigid collector membrane having a top surface which is open to the atmosphere thereabove for receiving said objects dropped thereon, said membrane having a multitude of air passages extending therethrough and inclined upwardly and horizontally toward a common margin of the membrane, an elongated, narrow conveyor membrane extending along said margin at an elevation not higher than that of said collector membrane and having an unobstructed upper surface, the latter membrane being open to the atmosphere thereabove and formed with a multitude of air passages extending therethrough and distributed along the length thereof, the latter passages being inclined upwardly and horizontally in a direction along said margin, means at the side of the conveyor membrane which is remote from the collector membrane for blocking movement of said objects across and beyond the conveyor membrane, plenum chambers including confining walls bounded at the top by the said membranes, and means for supplying air under pressure to said plenum chamber means for flow of said air through said air passages of said membranes upwardly with strong horizontal flow components to exert upward forces on said objects and propel them over the collector membrane onto the conveyor membrane and thence, with change of direction induced by air jets issuing from the air passages of the conveyor membrane, over the latter.

References Cited in the file of this patent

UNITED STATES PATENTS

| | | |
|---|---|---|
| 662,574 | McGary | Nov. 27, 1900 |
| 713,787 | McKone | Nov. 18, 1902 |
| 756,600 | Dodge | Apr. 5, 1904 |
| 898,775 | Norton | Sept. 15, 1908 |
| 1,048,477 | Allington | Dec. 31, 1912 |
| 1,050,478 | Lister | Jan. 14, 1913 |
| 1,515,965 | Pardee | Nov. 18, 1924 |
| 1,842,416 | Ludwig | Jan. 26, 1932 |
| 2,530,429 | Hedenskoog | Nov. 21, 1950 |
| 2,778,691 | Hazel | Jan. 22, 1957 |
| 2,805,898 | Willis | Sept. 10, 1957 |
| 2,848,820 | Wallin | Aug. 26, 1958 |

FOREIGN PATENTS

| | | |
|---|---|---|
| 840,984 | Great Britain | July 13, 1960 |

OTHER REFERENCES

German printed application, 1,008,200, May 9, 1957.